April 1, 1969　　SUSUMU TAKAO ET AL　　3,436,438
PROCESS FOR THE SEPARATION OF CONJUGATED DIOLEFINS
Filed Dec. 27, 1966
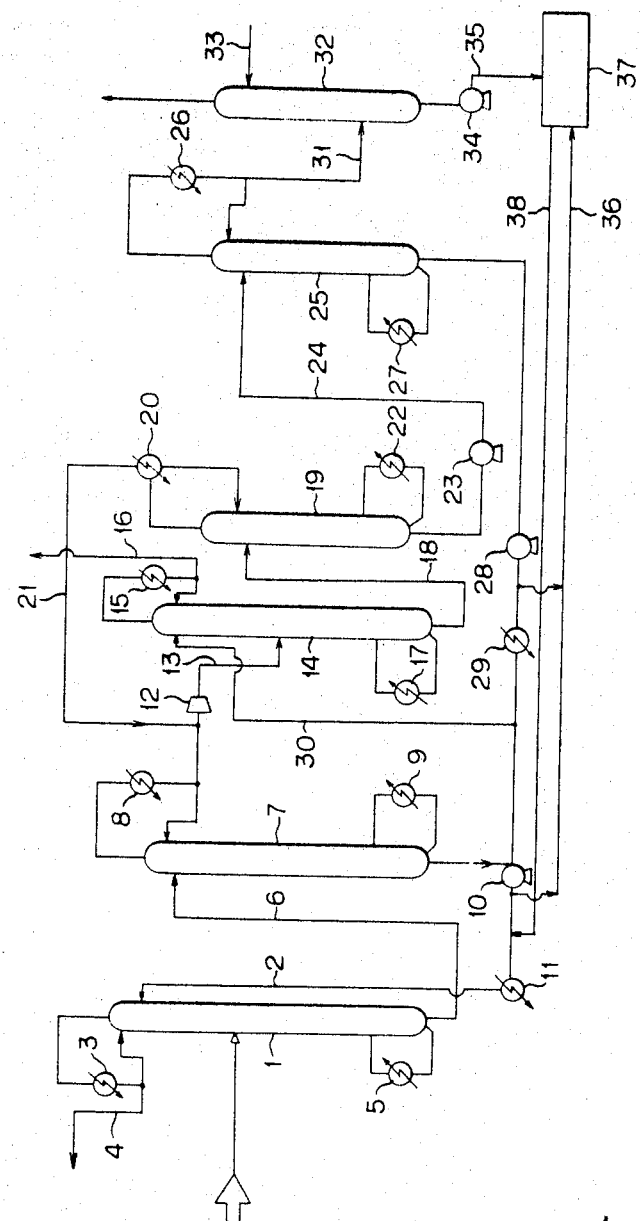
INVENTORS
Susumu TAKAO
Hiroshi HOKARI
By McGlew and Toren
ATTORNEYS United States Patent Office
3,436,438
Patented Apr. 1, 1969

3,436,438
PROCESS FOR THE SEPARATION OF
CONJUGATED DIOLEFINS
Susumu Takao, Chigasaki-shi, and Hiroshi Hokari, Tokyo,
Japan, assignors to The Japanese Geon Co., Ltd., Tokyo,
Japan, a Japanese corporation
Filed Dec. 27, 1966, Ser. No. 604,923
Claims priority, application Japan, Dec. 30, 1965,
40/81,401, 40/81,402
Int. Cl. C07c 7/08
U.S. Cl. 260—681.5                        10 Claims

ABSTRACT OF THE DISCLOSURE

Process for the separation of conjugated diolefin from a $C_4$ or $C_5$ hydrocarbon mixture containing the diolefin and higher acetylenes. According to the process, the hydrocarbon mixture is subjected in an extractive distillation column to extractive distillation with a solvent which mainly comprises an N-alkyl-substituted lower aliphatic acid amide. By means of the extractive distillation the diolefin is recovered in the form of a distillate and substantially free from the higher acetylenes. A liquid extract containing the higher acetylenes and the solvent is also recovered which extract is then subjected in a separate stripping column to stripping to recover the acetylenes and the solvent. The lower aliphatic acid amide used as solvent has the formula

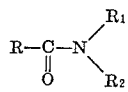

wherein R and $R_1$ individually mean hydrogen or lower alkyl of 1 to 3 carbon atoms and $R_2$ is lower alkyl of 1 to 3 carbon atoms.

Summary of the invention

This invention relates to a process for the purification of conjugated diolefins. More particularly, the present invention is concerned with a process for the removal of acetylenically and/or allenically unsaturated hydrocarbons from a hydrocarbon mixture containing conjugated diolefins together with said unsaturated hydrocarbons, which comprises subjecting said hydrocarbon mixture to extractive distillation with a solvent mainly comprising an N-alkyl substituted lower aliphatic acid amide. Further, the present invention is concerned with a process for the recovery of pure conjugated diolefins from a hydrocarbon mixture containing the conjugated diolefins, paraffinic, mono-olefinic, acetylenic and/or allenic hydrocarbons, which comprises subjecting said hydrocarbon mixture to extractive distillation with a solvent mainly comprising an N-alkyl-substituted lower aliphatic acid amide, thereby to obtain a conjugated diolefin-rich fraction which is further subjected to extractive distillation using the same solvent as above, thereby to remove the acetylenic and/or allenic hydrocarbons as an extract from said fraction.

The term, "conjugated diolefins," used herein means unsaturated hydrocarbons having a conjugated double bond, e.g. 1,3-butadiene, isoprene, 1,3-pentadiene, cyclopentadiene, etc. The term, "higher acetylenes" used herein means acetylenically unsaturated hydrocarbons having a carbon-to-carbon triple bond, e.g. ethyl acetylene, dimethyl acetylene, vinyl acetylene, propyl acetylene, allyl acetylene, etc. and allenically unsaturated hydrocarbons having a cumulated double bond, e.g. 1,2-butadiene, 1,2-pentadienes, etc.

In the manufacture of ethylene and/or propylene by thermal cracking of a petroleum fraction, e.g. LPG, naphtha, etc., a hydrocarbon fraction containing conjugated diolefins is obtained as by-product, from which can be recovered a $C_4$-hydrocarbon mixture ($C_4$-fraction) comprising 1,3-butadiene and a $C_5$-hydrocarbon mixture ($C_5$-fraction) comprising isoprene, 1,3-pentadiene and cyclopentadiene. Usually, the $C_4$-fraction contains butanes, n-butenes, isobutene, 1,3-butadiene, vinyl acetylene, ethyl acetylene, 1,2-butadiene, etc. and the $C_5$-fraction contains pentanes, n-pentenes, iso-amylene, cyclopentene, isoprene, trans- or cis-1,3-pentadiene, cyclopentadiene, higher acetylenes, etc. Further, the recovery of a $C_4$-fraction containing 1,3-butadiene is known in the catalytic dehydrogenation of n-butane and/or n-butene, and that of a $C_5$-fraction containing isoprene is known in the dehydrogenation of isopentane and/or isoamylene. It is also known that a thermally cracked oil obtained by cracking of a petroleum fraction contains conjugated diolefins. These fractions usually contain the small amount of higher acetylenes.

Extractive distillation is known as an effective method for separating desirable conjugated diolefins from the above-mentioned, conjugated diolefin-containing hydrocarbon mixture. For instance, the individual components of the $C_4$-hydrocarbon mixture usually have boiling points falling within a narrow range. That is to say, isobutane has a boiling point of $-11.07°$ C.; n-butane B.P. $-0.5°$ C.; iso-butene B.P. $-6.9°$ C.; 1-butene B.P. $-6.3°$ C.; trans-2-butene B.P. $0.9°$ C.; cis-2-butene B.P. $3.7°$ C.; 1,3-butadiene B.P. $-4.7°$ C.; 1,2-butadiene B.P. $10.3°$ C.; vinyl acetylene B.P. $5.0°$ C.; and ethyl acetylene B.P. $8.6°$ C. Furthermore, these components sometimes form an azeotrope. Because of these facts, an ordinary distillation method is not effective for separation of pure 1,3-butadiene from the said mixture.

In the prior art processes for the recovery of 1,3-butadiene from the $C_4$-fraction, there has been commonly employed the extractive distillation system using acetonitrile, furfural, N-methylpyrrolidone or the like as a selective solvent or the ordinary extraction system using an aqueous cuprous ammonium acetate (CAA) solution. These known processes, however, are technically disadvantageous in that not only desired 1,3-butadiene but also undesired higher acetylenes (e.g. ethyl acetylene, vinyl acetylene, etc.) and 1,2-butadiene are simultaneously extracted with the solvent used. For example, such 1,3-butadiene product as obtained by extractive distillation inavoidably accompanies the considerable amount of vinyl acetylene, which, during the subsequent ordinary distillation, forms with cis- and/or trans-2-butene and azeotropic mixture which is difficult to be separated from 1,3-butadiene because the boiling point of said azeotropic mixture is very close to that of 1,3-butadiene.

On the other hand, it is notorious that 1,3-butadiene intermingled with higher acetylenes is not suitable as a raw material for the production of stereospecific polybutadiene. This is because that among the higher acetylenes, acetylenically unsaturated hydrocarbons cause deactivation of a polymerization catalyst used and allenically unsaturated hydrocarbon do decrease in molecular weight of the polybutadiene as produced. Therefore, 1,3-butadiene to be used for the production of stereospecific polybutadiene should have a 1,3-butadiene purity of higher than 98.5%, a higher acetylene content of less than 100 p.p.m. and a 1,2-butadiene content of less than 100 p.p.m. In order to meet these requirements, various attempts for the removal of higher acetylenes have been made, which include selective hydrogenation or oxidation of the higher acetylenes in the presence of a specific catalyst. However, this selective hydrogenation or oxidation process requires hydrogen or oxygen and a catalyst. This means that there is a necessity of an additional step which is quite dissimilar to the steps involved in butadiene extraction.

Besides 1,3-butadiene, isoprene is known as a commercially valuable conjugated diolefin. Similarly in case of the 1,3-butadiene, the extractive distillation of the $C_5$-fraction obtained from the hydrocarbon decomposate or of the crude isoprene obtained by dehydrogenation of isopentane or isoamylene is known, in addition to the synthetic route from isobutene and formaldehyde or that from acetylene and acetone. In such extractive distillation, too, the small amount of acetylenically and allenically unsaturated hydrocarbons inavoidably entrains in the extracted isoprene and this makes it unsuitable to use the isoprene for production of stereospecific polyisoprene. In the following description, our explanation will be given mainly with reference to the $C_4$-fraction, but it is to be understood that the explanation similarly applies to the $C_5$-fraction.

It is one object of the invention to provide conjugated diolefins substantially free from acetylenically and allenically unsaturated hydrocarbons. Another object of the invention is to provide 1,3-butadiene substantially free from higher acetylenes and 1,2-butadiene, said 1,3-butadiene being so pure that it may be used in the production of stereospecific polybutadiene. Still another object of this invention is to provide isoprene free from higher acetylenes. Other objects, features and capabilities comprehended by the invention will be apparent from the following description.

The present invention is based on our new finding that if dimethyl formamide is used as a solvent for extractive distillation of 1,3-butadiene or a $C_4$-fraction containing 1,3-butadiene, higher acetylenes (e.g. vinyl acetylene 1,2-butadiene, etc.) can be selectively and completely removed. Heretofore, it has been known that dimethyl formamide can be a selective solvent for the extraction of diolefin at high concentration from a hydrocarbon mixture, particularly for the separation of mono-olefin and diolefin (cf. U.S.P. 2,386,927). However, no attention has been paid to the applicability of dimethyl formamide in the commercial scale purification of conjugated diolefins. We have now discovered that N-alkyl-substituted lower aliphatic acid amides including dimethyl formamide can be selective solvents for separation of higher acetylenes and conjugated diolefins.

In accordance with the invention, higher acetylenes (i.e. acetylenically unsaturated hydrocarbons and/or allenically unsaturated hydrocarbons) can be removed from the conjugated diolefin-containing hydrocarbon fraction by subjecting said fraction to extractive distillation with an N-alkyl-substituted lower aliphatic acid amide, thereby to obtain said higher acetylenes as the extracted fraction.

In another aspect of the present invention, highly pure conjugated diolefins can be recovered from the conjugated diolefin-containing hydrocarbon mixture by carrying out the first step wherein said mixture is subjected to extractive distillation with an N-alkyl-substituted lower aliphatic acid amide thereby to obtain a fraction mainly comprising the conjugated diolefins and the second step wherein the fraction is further subjected to extractive distillation with the same solvent as in the first step, thereby to remove acetylenically and/or allenically unsaturated hydrocarbons as the extract. A subsequent ordinary distillation may be added for further purification, if this is desired.

N-alkyl-substituted lower aliphatic acid amides which are suitable in this invention can be represented by the following general formula

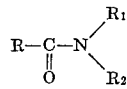

wherein R and $R_1$ individually mean hydrogen atom or a lower alkyl radical having 1 to 3 carbon atoms, e.g. methyl, ethyl, propyl and isopropyl; and $R_2$ means a lower alkyl radical having 1 to 3 carbon atoms, e.g. methyl, ethyl, propyl and isopropyl. Typical N-alkyl-substituted lower aliphatic acid amides are the N-monoalkyl- or N,N - dialkyl - substituted derivatives of formamide, acetamide, propionamide and butyramide. Specifically they are monomethyl formamide, dimethyl formamide, diethyl formamide, dimethyl acetamide, methylpropyl acetamide, dimethyl propionamide, monoethyl butyramide, etc. Among these, dimethyl formamide, diethyl formamide and dimethyl acetamide are preferred because of their extracting power, boiling point and availability. Particularly suitable is dimethyl formamide. N-alkyl-substituted lower aliphatic acid amides of the given formula wherein any one of R, $R_1$ and $R_2$ contains more than three carbon atoms are not satisfactory in extractive distillation because of their poor extracting power and high boiling point.

As apparent for those skilled in the art, an N-alkyl-substituted lower aliphatic acid amide which is used as a solvent in the present invention may be added with any other suitable additive to facilitate intended extractive distillation. For example, addition of a polymerization inhibitor is preferred because the polymerization of unsaturated components occasionally takes place under the operation conditions (e.g. at an operating temperature) to cause choking of the distillation apparatus used. Sometimes, water, methanol or any other suitable additive which has a boiling point higher than that of the material to be extracted but lower than the used N-alkyl-substituted aliphatic acid amide can be used together with the solvent. This allows us to carry out intended extractive distillation at a lower operating temperature. Thus it is to be understood that the expression, "a solvent mainly comprising an N-alkyl-substituted aliphatic acid amide," used in this specification and particularly in claims intends to mean not only the N-alkyl-substituted aliphatic acid amide per se but also a mixture of the N-alkyl-substituted aliphatic acid amide with any suitable additive or adjuvant. In the separation of conjugated diolefins by extractive distillation, generally it is common to use as a solvent a mixture of a polar substance with the small amount of water, in order to decrease operating temperature, to improve selectivity and to prevent polymer formation. However, use of water or methanol in combination with an N-alkyl-substituted aliphatic acid amide of this invention is not always desirable, as this sometimes causes corrosion of the apparatus and decrease of solubility of individual solvents. As a polymerization inhibitor to be added to the solvent, those which can prevent polymerization of conjugated diolefins and higher acetylenes and those which can take chain transfer action may be used. For example, tert.-butyl catechol, sulfur, sodium nitrite, furfural, benzaldehyde, aromatic nitrocompounds, etc., are suitable polymerization inhibitors. Among these, furfural, benzaldehyde and aromatic nitro compounds singly or in combination are preferred. These additives should be used in amount of less than 30% by weight, so that the efficient action of an N-alkyl-substituted aliphatic acid amide may be ensured. If said additive is a polymerization inhibitor, an amount of about 0.01 to 30% by weight based on the solvent will be satisfactory. About 0.1 to 10% by weight of such inhibitor is preferable.

Sometimes, a flooding phenomenon is observed in the extractive distillation column owing to the formation of polymeric material from the unsaturated hydrocarbons and/or additives. In such a case, the addition of small amount of antifoaming agent such as polydimethylsiloxane is preferable.

A conjugated diolefin-containing hydrocarbon mixture as a suitable feedstock in a process of the present invention may be a $C_4$- or $C_5$-fraction obtained by thermal cracking of a petroleum fraction (e.g. LPG, naphtha, etc.), a butadiene-containing fraction obtained by dehydrogenation of n-butane and/or n-butene, and an isoprene-containing fraction obtained by dehydrogenation of isopentane and/or isoamylene.

A process of the present invention can be coupled with various steps for extraction of conjugated diolefins. In case of a $C_4$-fraction, for instance, saturated hydrocarbons and monoolefins are removed therefrom by extractive distillation with acetonitrile, N-methyl pyrrolidone or the like thereby to obtain a fraction mainly comprising 1,3-butadiene, which fraction is then subjected to extractive distillation according to the present invention, thereby to remove therefrom the entrained higher acetylenes (i.e. ethyl acetylene, vinyl acetylene, 1,2-butadiene, etc.). Alternatively, the $C_4$-fraction is subjected to extractive distillation according to the present invention thereby to remove higher acetylenes as extracted portion and then the distilled portion is treated by the conventionally known procedures to obtain 1,3-butadiene. Of course, the former embodiment is more convenient than the latter, because the gas volume to be treated in the former embodiment is less than that in the latter and accordingly the apparatus required in the former is more compact than that of the latter. Further it is noteworthy that if a solvent mainly comprising an N-alkyl-substituted lower aliphatic acid amide is used in the first extractive distillation stage of the above-mentioned former embodiment, it is possible to obtain 1,3-butadiene sufficiently pure to prepare stereospecific polybutadiene, while common solvent-supplying and solvent-recovering equipments are used with a great economical advantage.

When a hydrocarbon mixture containing paraffinic hydrocarbons, mono-olefinic hydrocarbons, conjugated diolefins and higher acetylenes is subjected to extractive distillation with a solvent mainly comprising an N-alkyl-substituted lower aliphatic acid amide, the paraffinic hydrocarbons and mono-olefinic hydrocarbons are recovered as a top distillate of the extractive distillation column, while the conjugated diolefins and higher acetylenes recovered as an extract. The extracted hydrocarbon fraction is further subjected to extractive distillation with the same solvent as above, whereby pure conjugated diolefins are recovered as a top distillate while the higher acetylenes recovered as an extract. Thus the two-stage extractive distillation process can be carried out to recover the conjugated diolefins. Strictly speaking, if a hydrocarbon mixture containing, together with a desirable conjugated diolefin, hydrocarbons which are less soluble than said conjugated diolefin and those which are more soluble than said conjugated diolefin is subjected to the first-stage extractive distillation, a mixture of said conjugated diolefin and the more soluble hydrocarbons is obtained as an extract while the less soluble hydrocarbons are removed as a top distillate. Then the extract of the first stage is subjected to the second-stage extractive distillation whereby said conjugated diolefin is recovered as a top distillate while the more soluble hydrocarbons are removed as an extract.

For example, the extractive distillation of a $C_4$-fraction firstly yields 1,3-butadiene, ethyl acetylene, vinyl acetylene and 1,2-butadiene as the extract, which, when subjected to further extractive distillation, produces 1,3-butadiene as a top distillate while ethyl acetylene, vinyl acetylene, 1,2-butadiene or other higher acetylenes are yielded as an extract. Extractive distillation of a $C_5$-fraction is somewhat more complicated than that of the $C_4$-fraction because of the existence of other additional conjugated diolefins than the desired conjugated diolefin. In the case of the $C_5$-fraction too, however, the desired conjugated diolefin is obtained by the two-stage extractive distillation. For example, if isoprene is desired, the extractive distillation of a $C_5$-fraction firstly yields isoprene, cyclopentadiene, 1,3-pentadiene, propyl acetylene, cyclopentene and other higher acetylenes as an extract, which, when subjected to further extractive distillation, yields isoprene as a top distillate while cyclopentadiene, 1,3-pentadiene, propyl acetylene, cyclopentene and other higher acetylenes are contained in a bottom liquid. Thus, a method of the present invention is noted to be successfully applicable to the two-stage extractive distillation as mentioned above. It is often that hydrocarbons having different carbon atoms from that of desired conjugated diolefin are present in small amounts in the $C_4$- or $C_5$-fraction used in the invention. Some of these hydrocarbons occasionally remain in the conjugated diolefin fraction obtained by the extractive distillation process. In such a case, a subsequent ordinary distillation process to the extractive distillation process is economically preferred to remove these hydrocarbons effectively. Also the subsequent distillation removes the impurities having the same carbon atoms as the desired conjugated diolefin, when the boiling point of the impurities is fairly different from that of said diolefin. For instance, it is not economical to completely separate methylacetylene ($C_3$-hydrocarbon) or isopentane ($C_5$-hydrocarbon) from 1,3-butadiene fraction containing a small amount of methyl acetylene or isopentane, by the extractive distillation. The subsequent ordinary distillation can easily remove these impurities from crude 1,3-butadiene. A small amount of remaining ethyl acetylene and/or 1,2-butadiene may also be removed. But vinyl acetylene must be completely removed by the extractive distillation, because vinyl acetylene forms with cis- and/or trans-2-butene an azeotropic mixture which has a very close boiling point to that of 1,3-butadiene. Similarly, in case of $C_5$-fraction, the subsequent ordinary distillation is also economically preferred to obtain a pure conjugated diolefin desired due to the existence of many components of $C_5$-fraction and the contamination of $C_4$- or $C_6$-hydrocarbons.

Acetylenically unsaturated hydrocarbons which can be removed by the present invention are those compounds which have at least one carbon-to-carbon triple bond, e.g. ethyl acetylene, dimethyl acetylene, vinyl acetylene, diacetylene, propyl acetylene, allyl acetyene, etc. Allenically unsaturated hydrocarbons which are removable by the present invention are those compounds which have a cumulated carbon-to-carbon double bond, e.g. 1,2-butadiene, 1,2-pentadiene, etc. In carrying out the present invention in practice, it is possible to remove these acetylenically unsaturated hydrocarbons and allenically unsaturated ones from a conjugated diolefin-containing fraction to a substantially perfect degree, thereby leaving highly pure conjugated diolefin as desired for the production of stereospecific polymeric diolefin.

Now our explanation will be made with reference to the attached drawing which is a flow diagram showing a typical embodiment of the invention, that is the recovery of highly pure conjugated diolefin from a hydrocarbon mixture containing, together with said diolefin, paraffinic hydrocarbon, monoolefinic hydrocarbons and higher acetylenes by two-stage extractive distillation. It will be understood that the latter half of the flow diagram is applicable to the removal of higher acetylenes from a conjugated diolefin fraction containing said higher acetylenes as impurities.

A conjugated diolefin-containing hydrocarbon fraction is fed into a first extractive distillation column 1 at its middle part, while a solvent is fed through a pipe 2 into said column at its top. The first-stage extractive distillation is carried out in the column by heating by means of a reboiler 5 attached to the bottom of said column. The top distillate which is in the form of vapor is condensed by means of a condenser 3 and a part of the resulted liquid condensate is returned back as reflux to the column top, while the remaining part which is substantially conjugated diolefin-free and mainly consists of paraffinic hydrocarbons and mono-olefinic hydrocarbons is exhausted through a pipe 4. A bottom liquid comprising, together with desired conjugated diolefin, higher acetylenes is withdrawn at the column bottom and then passed through a pipe 6 to the top of a stripping column 7, in which stripping is conducted by heating by means of a reboiler 9 located at the bottom of the column 7. A vapor mixture of conjugated diolefin, higher acetylenes, and small amount of the used solvent is passed from the column top to a cooler 8, from which a part of the resulting liquid condensate is returned back as reflux to the column top. From the bottom of the stripping column 7, only the solvent used is withdrawn through a pump 10 to a cooler 11. The cooled solvent is recycled through a pipe 2 to the extractive distillation column 1. The vapor from the cooler 8 is passed through a compressor 12 and a pipe 13 to a second extractive distillation column 14.

This second extractive distillation column may be greatly reduced in size in comparison with the first one, because the hydrocarbon stock to be treated therein is already free from paraffinic hydrocarbons and monoolefinic hydocarbons. The required solvent amount also may be reduced. The operation of the second extractive distillation column may be completely the same as in the first extractive distillation column. The conjugated diolefin-containing fraction flowing through pipe 13 is fed into the extractive distillation column 14 at its middle part. The solvent is fed through a pipe 30 to the top of the column 14. At the bottom of the column 14, heating is effected by way of a reboiler 17 in order to expel the dissolved conjugated diolefin. Because of its relatively low solubility, most of the conjugated diolefin is passed into a condenser 15 attached to the top of the column and then condensed. A part of the resulted liquid condensate is refluxed to the column 14, while the remaining part is recovered through a pipe 16 as a distillate which is conjugated diolefin substantially free from higher acetylenes. This distillate may be subsequently subjected to ordinary distillation, if necessary. From the bottom of the column, the bottom liquid which contains higher acetylenes having relatively high solubility together with the conjugated diolefin are withdrawn through a pipe 18 and then reduced in pressure before the said bottom liquid is passed into the upper part of the recovery tower 19, wherein the recovery of still remaining conjugated diolefin is intended. Depending on the operating conditions of the column 14 and the allowance of loss in conjugated diolefin, the recovery tower 19 may be omitted.

The bottom liquid passed into the recovery tower 19 is heated by way of a reboiler 22, whereby entrained conjugated diolefin is recovered from the top of the tower. This recovered conjugated diolefin is passed through a cooler 20 and a pipe 21 to a compressor 12 and then returned back to the column 14.

From the bottom of the recovery tower 19, the solvent which contains higher acetylenes is withdrawn and then passed through a pump 23 and a pipe 24 to a stripping column 25 which is similarly operated as the stripping column 7 of the first stage. From the bottom, the solvent used is recovered and then returned through a pump 28, a cooler 29 and a pipe 30 back to the column 14. Since this solvent is chemically the same as that used in the first stage, it may be combined with the solvent of the first stage. Vapor from the top of the column 25, which contains higher acetylenes and a small amount of conjugated diolefin, is partly refluxed by way of a cooler 26, while the remaining portion is passed to a water-washing tower 32 to recover the small amount of the solvent.

In the water-washing tower 32, washing is effected by using a small amount of water fed through a pipe 33 at the top of the tower. As the solvent used is fairly soluble in water, it can be recovered completely by water-washing. The washings containing the solvent is passed through a pump 34 and a pipe 35 to a solvent purifying unit 37 wherein the solvent is purified for reuse. The solvent which is brought into recycling is contaminated with the polymer of conjugated diolefin, higher acetylenes and/or the like. Therefore, a part of the recycled solvent is withdrawn through a pipe 36 and passed into the solvent purifying unit 37 and then, after purificaton, is returned to a system through a pipe 38.

The following examples describe certain ways in which the principle of the invention has been applied, but are not to be construed as limiting its scope. In these examples, quantitative analyses were conducted by gas chromatography.

Example 1

The apparatus indicated in the attached drawing was employed.

The extractive distillation was conducted by supplying a starting gas which had the composition as shown in Table 1 into the middle portion of the first extractive distillation column having 72 plates at the rate of 15.0 Nm.$^3$/hr. The solvent amount used was 210 l./hr. and the reflux amount was 45 kg./hr. When the column was operated at 3 kg./cm.$^2$g. of column top pressure, 45° C. of top temperature and 138° C. of bottom temperature, 4.4 Nm.$^3$/hr. of gas (shown under item of "First-stage Purification" in Table 1) were recovered from the top of the first stripping column. Most of butanes and butenes are removed.

TABLE 1.—COMPOSITION OF GASES (PERCENT BY VOLUME)

| Components | Feedstock (percent) | First-stage purification (percent) | Second-stage purification (percent) |
|---|---|---|---|
| Iso-butane | 0.8 | 0 | |
| n-Butane | 8.9 | 0 | |
| 1-butene, iso-butene | 50.4 | 0 | |
| Trans 2-butene | 5.7 | 0.2 | 0.2 |
| Cis 2-butene | 3.8 | 0.4 | 0.4 |
| 1,3-butadiene | 30.0 | 98.1 | 99.4 |
| 1,2-butadiene | | 0.4 | 1 <10 |
| Ethylacetylene | 0.4 | 0.3 | 1 <10 |
| Vinyl acetylene | | 0.6 | 1 <10 |

[1] P.p.m.

This recovered gas was introduced into the second extractive distillation column having 36 plates by way of the compressor and the extractive distillation of same was conducted at 26 l./hr. of solvent amount and 15 kg./hr. of reflux amount. The column pressure at its top portion was 3 kg./cm.$^2$g., the top temperature was 50° C. and the bottom temperature was 140° C. The recovery tower having 30 plates was used. 4.3 Nm.$^3$/hr. of gas were recovered from the top of the second extractive distillation column. The composition of the recovered gas is as shown in the previous Table 1. Although there was not contained diacetylene in the starting gas, it is more easily separable than the above higher acetylenes.

The solvent used consisted of 5% by weight of furfural, 0.1% by weight of sodium nitrite and 94.9% by weight of dimethyl formamide and was able to run for over 500 hours in succession without any solvent purification.

Example 2

By employing the extractive distillation apparatus as employed in the second step of the Example 1, the extractive distillation was conducted. A starting gas which had the composition as shown in Table 2 was supplied at the rate of 150 Nm.$^3$/hr. and the extractive distillation was conducted at 3 kg./cm.$^2$ g. of column pressure at its top portion, 47° C. of the top temperature and 145° C. of the bottom temperature, 122 l./hr. of solvent amount and 75 kg./hr. of reflux amount were employed. From the top of the column, 14.89 Nm.$^3$/hr. of gas having the composition as shown in Table 2 were recovered:

TABLE 2.—COMPOSITION OF GASES (PERCENT BY VOLUME)

| Components | Feedstock (Percent) | Refined (Percent) |
|---|---|---|
| ISo-butane | 0.8 | 0.8 |
| n-Butane | 8.9 | 8.9 |
| 1-butene, iso-butene | 50.4 | 51.0 |
| Trans 2-butene | 5.7 | 5.7 |
| Cis 2-butene | 3.8 | 3.8 |
| 1,3-butadiene | 30.0 | 29.8 |
| 1,2-butadiene | | 1 <10 |
| Ethyl acetylene | 0.4 | 1 <10 |
| Vinyl acetylene | | 1 <10 |

[1] P.p.m.

The solvent used in this example was same as that used in the Example 1.

Example 3

By employing the apparatus shown in the diagram of the drawing, isoprene was separated from $C_5$-fraction.

The extractive distillation was conducted by introducing a starting gas having the composition as shown in Table 3 into the middle portion of the first extractive distillation column having 92 plates at the rate of 10.0 Nm.$^3$/hr. The solvent amount used was 355 l./hr. and the reflux amount was 78 kg./hr.

When the column was operated at 0.4 kg./cm.$^2$ g. of pressure at the top and 150° C. of bottom temperature. 2.0 Nm.$^3$/hr. of gas were recovered from the top of the first stripping column. Most of pentanes and pentenes are removed.

This recovered gas was introduced into the second extractive distillation column having 66 plates and the extractive distillation of same was conducted at 62 l./hr. of solvent amount and 37 kg'/hr. of reflux amount. The pressure at the top of the column was 0.1 kg./cm.$^2$ g. and the bottom temperature was 154° C. Thus, 1.9 Nm.$^3$ of gaseous isoprene of 98.4% purity was recovered from the top of the second extractive distillation column.

By the further ordinary distillation, 99.8% purity of isoprene, could be obtained. The solvent used consisted of 5% by weight of furfural, 2% by weight of nitrobenzene, 0.1% by weight of sodium nitrite and 92.9% by weight of dimethyl formamide.

TABLE 3.—COMPOSITION OF GASES (PERCENT BY VOLUME)

| Components | Feedstock (percent) | First-stage purification (percent) | Second-stage purification (percent) |
|---|---|---|---|
| Iso-pentane | 26.4 | | |
| N-Pentane | 23.9 | | |
| 1-pentene | | | |
| 3-methyl-1-butene | 17.1 | | |
| 2-methyl-1-butene | | | |
| Trans-2-pentene | | | |
| Cis-2-pentene | 8.87 | 0.2 | 0.23 |
| 2-methyl 2-butene | | | |
| 1,4-pentadiene | 2.2 | $^1$<50 | $^1$<50 |
| Isoprene | 20.0 | 92.15 | 98.40 |
| Trans-1,3-pentadiene | 0.8 | 4.0 | 1.22 |
| Cis-1,3-pentadiene | | | |
| Propyl acetylene | 0.2 | 1.0 | $^1$<5 |
| Allyl acetylene | | | |
| Cyclopentadiene | 0.5 | 2.5 | $^1$<10 |
| 1,2-pentadiene | | | |
| Cyclopentene | 0.03 | 0.15 | 0.15 |
| 2-methyl pentane | | | |

$^1$ P.p.m.

What is claimed is:

1. A process for the separation of conjugated diolefin from a $C_4$- or $C_5$-hydrocarbon mixture containing said diolefin and higher acetylenes, which comprises subjecting the hydrocarbon mixture in an extractive distillation column to extractive distillation with a solvent consisting essentially of an N-alkyl-substituted lower aliphatic acid amide thereby to separate the diolefin substantially free from the higher acetylenes as a distillate and to form a liquid extract containing the higher acetylenes and the solvent, and then subjecting said extract in a separate stripping zone and in the absence of a hydrocarbon diluent to stripping, thereby to recover the higher acetylenes and the solvent, said lower aliphatic acid amide having the formula $$R-\underset{\underset{O}{\|}}{C}-N\diagup^{R_1}_{R_2}$$

wherein R and $R_1$ individually mean hydrogen or lower alkyl of 1 to 3 carbon atoms and $R_2$ means lower alkyl of 1 to 3 carbon atoms.

2. A process for the separation of a conjugated diolefin from a $C_4$- or $C_5$-hydrocarbon mixture containing said conjugated diolefin, more soluble hydrocarbons than said conjugated diolefin and less soluble hydrocarbons than said conjugated diolefin, which comprises subjecting said hydrocarbon mixture in a first extractive distillation column to a first-stage extractive distillation with a solvent consisting essentially of an N-alkyl-substituted lower aliphatic acid amide to separate a distillate containing the less soluble hydrocarbons and to obtain an extract containing said conjugated diolefin, the more soluble hydrocarbons and the solvent; subjecting said extract in a separate stripping zone to stripping in the absence of a hydrocarbon diluent thereby to recover a mixture of the conjugated diolefin, the more soluble hydrocarbon and the solvent; subjecting said mixture in a second extractive distillation column to a second-stage extractive distillation with the same solvent to separate said conjugated diolefin as a distillate and to form an extract containing the more soluble hydrocarbons and the solvent; and subjecting said extract to stripping in the absence of a hydrocarbon diluent thereby to recover the more soluble hydrocarbons and the solvent, said lower aliphatic acid amide having the formula $$R-\underset{\underset{O}{\|}}{C}-N\diagup^{R_1}_{R_2}$$

wherein R and $R_1$ individually mean hydrogen or lower alkyl of 1 to 3 carbon atoms and $R_2$ means lower alkyl of 1 to 3 carbon atoms.

3. A process as claimed in claim 1, wherein the solvent is dimethyl formamide, diethyl formamide or dimethyl acetamide.

4. A process as claimed in claim 2, wherein the solvent is dimethyl formamide, diethyl formamide or dimethyl acetamide.

5. A process as claimed in claim 1, wherein the solvent is used in admixture with from about 0.01 to 30% by weight of a polymerization inhibitor.

6. A process as claimed in claim 2, wherein the solvent is used in admixture with from about 0.01 to 30% by weight of a polymerization inhibitor.

7. A process as claimed in claim 1, wherein the extractive distillation is performed under anhydrous conditions.

8. A process as claimed in claim 2, wherein the extractive distillation is performed under anhydrous conditions.

9. A process as claimed in claim 2, further comprising the ordinary distillation of the obtained distillate thereby to effect further purification of the conjugated diolefin.

10. A process as claimed in claim 2, wherein the extract containing the more soluble hydrocarbons and the solvent obtained in the second extractive distillation column is introduced into a recovery tower and distilled to recover residual conjugated diolefin from the extract, whereafter the recovered conjugated diolefin is recycled to the second extractive distillation while the remaining extract is subjected to stripping thereby to recover the more soluble hydrocarbons and the solvent.

References Cited

UNITED STATES PATENTS

| | | | |
|---|---|---|---|
| 2,386,927 | 10/1945 | Boyd | 203—60 |
| 2,338,041 | 10/1945 | Craig | 203—9 |
| 2,993,841 | 7/1961 | Sarno | 203—9 |
| 3,000,794 | 9/1961 | Tschopp | 202—39.5 |
| 3,230,157 | 1/1966 | Hill et al. | 203—53 |
| 3,242,227 | 3/1966 | Kroeper et al. | 260—681.5 |
| 3,309,412 | 3/1967 | Sakuragi et al. | 260—666.5 |
| 3,317,627 | 5/1967 | King et al. | 260—681.5 |

DELBERT E. GANTZ, *Primary Examiner.*

G. E. SCHMITKONS, *Assistant Examiner.*

U.S. Cl. X.R.

203—60, 9